Nov. 18, 1952  R. A. SHIELDS  2,618,521
WHEEL AND AXLE ASSEMBLY
Filed Jan. 5, 1949
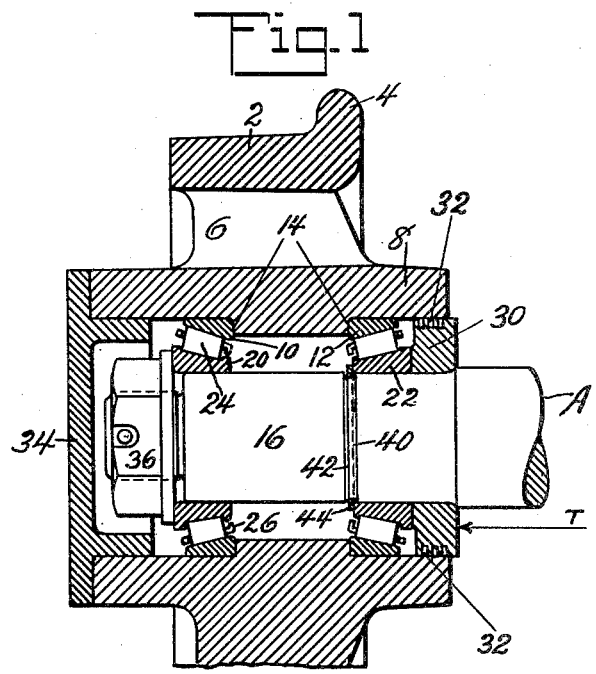
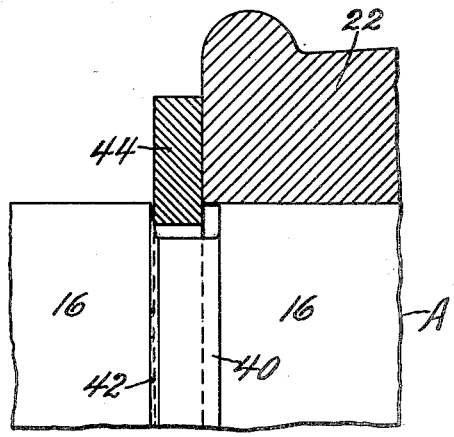
INVENTOR
Robert A. Shields Patented Nov. 18, 1952

2,618,521

UNITED STATES PATENT OFFICE 2,618,521

WHEEL AND AXLE ASSEMBLY

Robert A. Shields, Bloomsburg, Pa., assignor to American Car and Foundry Company, New York, N. Y., a corporation of New Jersey Application January 5, 1949, Serial No. 69,300

6 Claims. (Cl. 308—211)

This invention relates to wheel and axle assemblies in general and in particular to such assemblies for use in mine or other industrial cars.

Mine and industrial cars normally run over trackage which is very rough and accordingly the wheel and axle assemblies are subjected to excessive lateral blows which must be absorbed by the bearing assembly. In order to absorb these lateral blows and transfer them to the wheel flanges and rail, tapered rollers have been found most satisfactory. However, such bearings require fairly accurate adjustment and the continued lateral blows tend to disturb the adjustment and pinch the bearings. It is an object, therefore, of the present invention to provide a wheel and axle assembly having the parts so constructed and arranged as to prevent shifting of the parts and pinching of the bearings.

A further object of the invention is the provision of a wheel and axle assembly in which the inner closure and inner axle race are prevented from shifting relative to the axle.

A yet further object of the invention is the provision of a wheel and axle assembly of the tapered roller type in which the inner axle race is resiliently urged and held against the inner closure member.

These and other objects of the invention will be apparent to persons skilled in the art from a study of the following description and accompanying drawings, in which Fig. 1 is a sectional view through the improved wheel and axle assembly, and Fig. 2 is an enlarged sectional view showing the improved locking means for the inner axle race.

Referring now to the drawings in detail it will be seen that the wheel is of the usual type having tread 2 and flange 4 joined by spokes 6 to the hub portion 8. The hub portion as shown is counterbored at both ends to receive outer and inner hub races 10 and 12 respectively. The hub races are preferably pressed into the wheel hub and into tight engagement with the spacing portion 14 left in the wheel hub during the counterboring operation. The axle A is provided with the journal portion 16 on which may be slid the outer and inner axle races 20 and 22 respectively. These races have their outer surfaces recessed so that when tapered rollers 24 are mounted thereon in cages 26 they form a complete assembly with the inner races and can be removed as units from the axle journal.

An inner closure member 30 is preferably pressed on the axle journal and forms a stop limiting the inward movement of the inner axle race 22. The outer surface of this closure is grooved as at 32 so as to form a dust and lubricant seal for the inner end of the wheel hub. The outer end of the wheel hub is closed by means of an outer closure or hub cap 34 fastened in position by any suitable means, yet readily removable so that the nut 36 can be adjusted on the threaded portion of the axle to thereby adjust the bearings to the proper amount of clearance for free running.

Outwardly of the inner axle race 22 the axle journal is grooved as at 40 with the outer wall 42 of the groove tapered downwardly and inwardly as best shown in Fig. 2. In this groove a resilient ring 44 of high strength material is inserted, which ring exerts a constant contracting pressure, thus tending to urge itself downwardly into the groove 40. This constant contracting pressure will, due to the tapered portion 42, constantly jam the inner axle race 22 against the closure member 30. Likewise, any outward movement of either the closure member 30 or inner axle race 22 is prevented by the resilient ring 44. It will thus be seen that any heavy axial thrust delivered in the direction of the arrow T by the body seal or other members can not drive the dust collar or inner closure member along the axle and accordingly can not pinch the bearings.

The assembly just described is accomplished by pressing the inner closure 30 on the axle, after which the inner race 22 with its tapered rollers is slipped into position and ring 44 snapped into place in the groove. Next the wheel with its hub races 10 and 12 pressed into position is placed on the axle and the outer axle race 20 with its rollers is inserted and the bearings adjusted by means of nut 36, after which the cap 34 is fastened on the wheel to close the outer end of the hub and together with the inner closure prevent entrance of dust or escape of lubricant.

While the invention has been described more or less in detail with specific reference to the form shown, it will be obvious that various modifications and rearrangements of parts other than those shown and described may be made without departing from the scope of the invention as defined by the following claims.

What is claimed is:

1. In a wheel and axle assembly for mine cars, a wheel having a hollow hub, an axle journal positioned in said hub in spaced concentric relationship thereto, inner and outer anti-friction bearing means interposed between said axle journal and hub and each including an axle race and a hub race separated by tapered rollers, an inner closure means for the wheel hub carried by the axle and limiting the inward movement along the axle journal of the inner axle race means, a groove cut in said axle journal adjacent the outer end of said inner axle race means, and a resilient ring positioned in said groove and overlapping said inner axle race means to limit the outward movement thereof.

2. In a wheel and axle assembly for mine cars, a wheel having a hollow hub, an axle journal positioned in said hub in spaced concentric relationship thereto, inner and outer anti-friction bearing means interposed between said axle journal and hub and each including an axle race and a hub race separated by tapered rollers, an inner closure means for the wheel hub carried by the axle and limiting the inward movement along the axle journal of the inner axle race means, a groove cut in said axle journal adjacent the outer end of said inner axle race means, and a resilient ring positioned in said groove and overlapping said inner axle race means to limit the outward movement thereof, said groove having the outer wall thereof tapered whereby said resilient ring is constantly urged toward said inner axle race means.

3. In a wheel and axle assembly for mine cars, a wheel having a hollow hub, an axle journal positioned in said hub in spaced concentric relationship thereto, inner and outer anti-friction bearing means interposed between said axle journal and hub and each including an axle race and a hub race separated by tapered rollers, an inner dust collar pressed on the axle and limiting inward movement of said inner axle race means, a groove in said axle and having a downwardly and inwardly sloping outer wall, and a contractable resilient ring disposed in said groove and bearing on the outer end of said inner axle race means to retain said race and dust collar in position.

4. In a wheel and axle assembly for mine cars, a wheel having a hollow hub, an axle journal positioned in said hub in spaced concentric relationship thereto, inner and outer anti-friction bearing means interposed between said axle journal and said hub and each including an axle race and a hub race separated by anti-friction bearing means, an inner closure means for the wheel hub carried by the axle and limiting inward movement along the axle journal of the inner axle race, and resilient means anchored on the axle journal and engaging the outer end of said inner axle race in a relation exerting end pressure thereagainst to limit the outward movement of the race along the axle journal.

5. In a wheel and axle assembly for mine cars, a wheel having a hollow hub, an axle journal positioned in said hub in spaced concentric relationship thereto, inner and outer anti-friction bearing means interposed between said axle journal and said hub and each including an axle race and a hub race separated by anti-friction means, an inner closure means for the wheel hub pressed on the axle inwardly of the inner axle race, and a contracting resilient ring anchored on the axle journal between said inner and outer anti-friction means and engaging the inner axle race in relation to hold said closure and inner axle race in axially fixed position upon said axle journal.

6. In a wheel and axle assembly for mine cars, a wheel having a hollow hub, an axle journal positioned in said hub in spaced concentric relationship thereto, inner and outer anti-friction bearing means interposed between said axle journal and said hub and each including an axle race and a hub race separated by anti-friction means, an inner closure member for the wheel hub carried on the axle journal inwardly of the inner axle race, and a resilient ring member anchored to the axle and exerting pressure against the inner axle race in a direction holding the latter against said closure member.

ROBERT A. SHIELDS.

REFERENCES CITED

The following references are of record in the file of this patent:

UNITED STATES PATENTS

| Number | Name | Date |
|---|---|---|
| 2,113,497 | Sanford | Apr. 5, 1938 |
| 2,340,648 | Daniel | Feb. 1, 1944 |

FOREIGN PATENTS

| Number | Country | Date |
|---|---|---|
| 399,234 | Germany | July 22, 1924 |
| 498,750 | Germany | May 27, 1930 |
| 765,697 | France | June 14, 1934 |